United States Patent [19]

Chen et al.

[11] Patent Number: 5,011,885

[45] Date of Patent: Apr. 30, 1991

[54] METHODS FOR THE PRODUCTION OF MICROCAPSULES USING FUNCTIONALIZED ISOCYANATE

[75] Inventors: Jing-Den Chen, Spring Valley; Kerry Kovacs, Centerville; Margaret T. Thomas, Medway; Rong-Chang Liang, Centerville, all of Ohio

[73] Assignee: The Mead Corporation, Dayton, Ohio

[21] Appl. No.: 428,098

[22] Filed: Oct. 27, 1989

[51] Int. Cl.$^5$ ............................................. C08L 75/04
[52] U.S. Cl. ................................. 524/591; 524/840; 427/213.34; 523/335; 428/423.1; 525/509; 528/59; 528/71
[58] Field of Search ................. 524/591, 840; 427/213.34; 523/335; 428/423.1; 525/509; 528/59, 71

[56] References Cited

U.S. PATENT DOCUMENTS

| | | |
|---|---|---|
| 3,405,070 | 10/1968 | Reyes .................................. 252/316 |
| 3,875,074 | 4/1975 | Vassiliades et al. ................. 252/316 |
| 3,886,084 | 5/1975 | Vassiliades .......................... 252/316 |
| 3,886,085 | 5/1975 | Kiritani et al. ...................... 252/316 |
| 3,897,361 | 7/1975 | Saeki et al. ......................... 252/316 |
| 4,138,362 | 2/1979 | Vassiliades et al. ................. 252/316 |
| 4,193,889 | 3/1980 | Baatz et al. ......................... 252/316 |
| 4,251,386 | 2/1981 | Saeki et al. ......................... 252/316 |
| 4,273,672 | 6/1981 | Vassiliades .......................... 252/316 |
| 4,328,119 | 5/1982 | Iwasaki et al. ...................... 252/316 |
| 4,353,809 | 10/1982 | Hoshi et al. ......................... 252/316 |
| 4,356,109 | 10/1982 | Saeki et al. ......................... 252/316 |
| 4,396,670 | 8/1983 | Sinclair ............................... 428/321.5 |
| 4,525,520 | 6/1985 | Shioi et al. .......................... 524/512 |
| 4,563,212 | 1/1986 | Becher et al. ....................... 71/118 |

Primary Examiner—Maurice J. Welsh
Attorney, Agent, or Firm—Thompson, Hine and Flory

[57] ABSTRACT

The present invention is directed to a method for preparing microcapsules which comprises:
preparing an aqueous dispersion or emulsion of a hydrophobic oily core material containing a polyvalent isocyanate, a polyvalent isothiocyanate, or an adduct thereof, having an anionic moiety; and
forming capsule walls around the droplets of said oily core material.

18 Claims, 2 Drawing Sheets

METHODS FOR THE PRODUCTION OF MICROCAPSULES USING FUNCTIONALIZED ISOCYANATE

BACKGROUND OF THE INVENTION

The present invention relates to improved methods for preparing microcapsules and more particularly to methods in which a polyisocyanate, polyisothiocyanate or an adduct thereof is present in the internal phase wherein the improvement resides in the polyisocyanate or adduct containing an anionic moiety.

U.S. Pat. No. 4,353,809 to Hoshi et al. discloses improved methods for preparing urea-formaldehyde and melamine-formaldehyde microcapsules wherein a polyvalent isocyanate, a polyvalent isothiocyanate or an adduct thereof is added to the oily internal phase or core material. When the oily internal phase is dispersed in the aqueous phase the polyisocyanate is believed to react with water and produce a thin shell or prewall of a polyurea which stabilizes the emulsion and provides better control over the size of the microcapsules.

While the method described in the aforementioned patent has been successful, an even more effective method has now been identified.

SUMMARY OF THE INVENTION

In accordance with the present invention, the polyisocyanate added to the internal phase is modified such that it includes at least one anionic moiety such as a COO— group or an $SO_3$— group. It has been found that these anionic isocyanates provide better capsule size control than the nonfunctionalized isocyanates described in the aforementioned patent. The anionic functionality appears to enhance the affinity of the isocyanate for water and thus enhance the ability of the isocyanate to find the oil-water interface. As a consequence of its greater affinity for the oil-water interface, the isocyanate is believed to be able to react with water in larger quantities and to form a more substantial polyurea shell or prewall at the oil-water interface. The wall also carries an anionic charge which makes the emulsion more stable under high shear conditions. By contrast, using the previous non-functionalized isocyanates, a thin polyurea shell forms around the internal phase droplet which cuts off the access of the internal phase to water before most of the isocyanate can move to the interface and react. Consequently, previously only a thin non-charged prewall could be formed which was less able to stabilize the particle size of the emulsion.

The anionic isocyanates used in the present invention may be polyvalent isocyanates containing a moiety including a COO— or $SO_3$— group, polyvalent isothiocyanates containing the aforementioned moiety, or an adduct thereof, such as an adduct obtained by reacting one or more of the aforementioned isocyanates with a polyhydric compound such as a polyol or a polyamine. Generally, the isocyanates may be prepared by reacting a non-functionalized polyisocyanate with a polyhydric compound containing an anionic moiety.

The present invention finds its most particular application in the preparation of urea-formaldehyde and melamine-formaldehyde microcapsules, but it is not limited to these processes. The methods of the present invention should also be useful in any method for preparing microcapsules where the use of the isocyanate and formation of the prewall is compatible with the encapsulation process. For example, the method of the present invention is also useful in forming microcapsules by interfacial polymerization as when an amine or polyol is added to the aqueous phase to react with the isocyanate at the interface. Examples of these processes are provided in U.S. Pat. No. 4,193,889 to Baatz et al. and U.S. Pat. No. 3,796,669 to Kiritani et al. It is also useful in methods involving coacervation analogous to the process described in U.S. Pat. No. 3,897,361 to Saeki et al., and in other methods of microcapsule formation.

Accordingly, one manifestation of the present invention is a method for preparing microcapsules which comprises:

preparing an aqueous dispersion or emulsion of a hydrophobic oily core material containing a polyvalent isocyanate, a polyvalent isothiocyanate, or an adduct thereof, having an anionic moiety; and forming capsule walls around the droplets of said oily core material.

Another manifestation of the invention is a method for forming amine-formaldehyde microcapsules such as ureaformaldehyde or melamine-formaldehyde which comprises:

forming an emulsion or dispersion of an oily core material containing a polyvalent isocyanate, a polyvalent isothiocyanate, or an adduct thereof containing an anionic moiety in a continuous aqueous phase, and enwrapping particles of said oily core material in an amine-formaldehyde condensation product.

Still another manifestation of the invention is microcapsules and pressure-sensitive or photosensitive recording sheets prepared by the above methods.

DETAILED DESCRIPTION OF THE INVENTION

Figure 1:
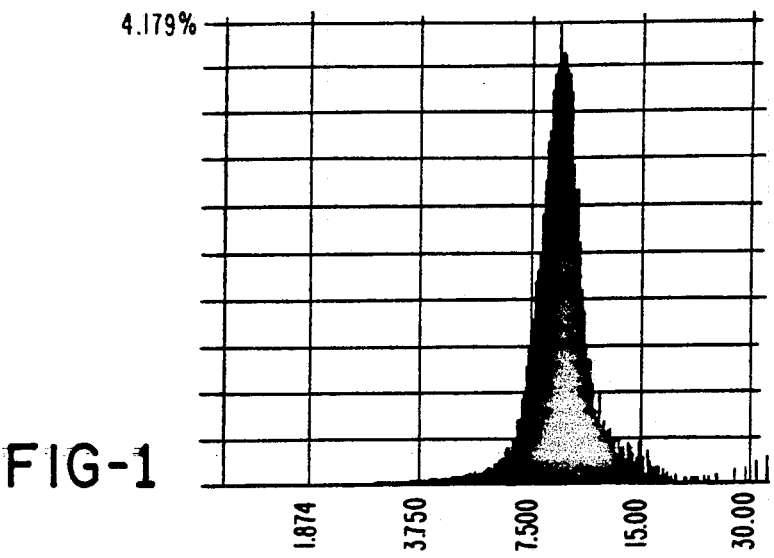
FIGS. 1, 3, 4 and 5 are particle size analyses for MF microcapsules prepared in accordance with this invention as outlined in Examples 1-4.

Certain embodiments of the present invention can be practiced by substituting anionic functionalized isocyanates and isothiocyanates and adducts thereof for all or a portion of the isocyanates and isothiocyanates in the methods described in U.S. Pat. Nos. 4,353,809 and 3,897,361 which are incorporated herein by reference.

Functionalized isocyanates can be prepared by reacting an organic compound having an acid group with an isocyanate or isothiocyanate. Useful acid groups can be selected from the class consisting of $OSO_3$—, $OPO_3^{-2}$, COO—, $SO_2O$—, $S_2O_3$—, POO— and $PO_3^{-2}$. The functionalized isocyanate can be prepared from reactants containing the salt group, or as is more normally the case, the free acid groups, which can be subsequently neutralized after prepolymer formation.

Suitable materials for introducing acid groups are organic compounds having at least one active hydrogen atom and at least one group capable of salt formation. Specific examples of these compounds are hydroxy, aminohydroxy, amino and marcaptocarboxylic acids, sulphonic acids, hydroxy and amino sulphonic acids such as dimethylol propionic acid, oxaluric acid, anilido acetic acid, hydroxyethyl propionic acid, dihydroxy maleic acid, dihydroxy tartaric acid, 2,6-dihydroxybenzoic acid, glycollic acid, thioglycollic acid, glycine, alpha alanine, 6-amino caproic acid, 2-hydroxyethane sulphonic acid, 4,6-diamino benzene, 1,3-disulphonic acid, 2-amino diphenylamino sulphonic acid, potassium 1,2-dihydroxypropyl thiosulphate (T.Y.T. Chui et al., Polymer Communications, 29, 40 (1988)), N,N-bis(2-hydroxyethyl)-2-amino-ethanesulfonic acid and salts thereof; cysteic acid and salts thereof, 3-hydroxypropane sulfonic acid and salts thereof, 5-sulfoisophthalic acid and salts thereof, 4-sulfoisophthalic acid and salts thereof, 3-phosphoglyceric acid, phosphoserine, phosphotheronine, phosphotyrosine, and the like. Chlorosulfonyl isocyanate will react with water and a polyisocyanate to yield a functionalized isocyanate. One sulfonated polyvalent isocyanate which is commercially available from Mobay Corp. under the tradename Desmodur DA is particularly useful.

The preparation of polyvalent isocyanates having a carboxyl group is more complex in that the isocyanate group reacts slowly with the carboxyl groups. Consequently, compounds having both free isocyanate groups and free carboxyl groups may polymerize unless the carboxyl group is appropriately blocked or the compound is prepared immediately prior to microencapsulation. This makes these compounds substantially less preferred for use in the invention.

Polyvalent isocyanates, polyvalent isothiocyanates or adducts thereof which can be used to prepare functionalized isocyanates are compounds containing two or more isocyanate or isothiocyanate groups. As discussed below, these compounds can also be used in combination with functionalized isocyanates. Representative examples of such compounds are diisocyanates and diisothiocyanates such as m-phenylenediisocyanate, p-phenylenediisocyanate (PPDI), 2,6,tolylenediisocyanate, 2,4-tolylenediisocyanate (TDI), naphthalene-1,4-diisocyanate, diphenylmethane4,4'-diisocyanate (MDI), hydrogenated MDI (HMDI), 3,3'-dimethoxy-4,4'-biphenyldiisocyanate, 3,3'-dimethylphenylmethane-4,4'-diisocyanate, xylylene1,4-diisocyanate, xylylene-1,3-diisocyanate, 4,4'-diphenylpropanediisocyanate, trimethylenediisocyanate, hexamethylenediisocyanate (HDI), biurets of HDI, propylene1,2-diisocyanate, butylene-1,2-diisocyanate, ethylidinediisocyanate, cyclohexylene-1,2-diisocyanate, cyclohexylene-1,4-diisocyanate, p-phenylenediisothiocyanate, xylylene-1,4-diisothiocyanate, ethylidineisothiocyanate and the like; triisocyanates such as 4,4',4"-triphenylmethane-triisocyanate, toluene- (2,4,6-triisocyanate, polymethylenepolyphenyltriisocyanate and the like; tetraisocyanates such as 4,4'-dimethyldiphenylmethane-2,2',5,5'-tetraisocyanate, m- and p-tetramethylzylene diisocyanate (TMXDI), isophorone diisocyanate (IPDI), their condensate products (dimers and trimers, etc.) and the like. These compounds may be reacted with the anionic functionalized polyhydric compounds described above for use in the invention.

Also useful in the present invention are sulfonated prepolymers such as adducts of HMDI or TDI with a sulfonated polyol or polyamine. Prepolymers having 15 or less repeating units are preferred.

The polyvalent isocyanate, the polyvalent isothiocyanate or the adduct or prepolymer thereof added to the hydrophobic oily liquid may be added to the hydrophobic oily liquid either directly or after being dissolved in an organic solvent.

The use of the isocyanates is not limited except that they are added to the hydrophobic oily liquid prior to the emulsification. They are added in an amount of about 0.005 to 10 parts per 100 parts of the hydrophobic oily liquid and preferably about 0.1 to 8 parts. A more preferred range is about 1 to 8 parts. Because the polyvalent isocyanate is not added for the purpose of forming the capsule walls (except possibly in interfacial microencapsulation forming polyurea or polyurethane walls), it is not necessary to add it in an amount more than necessary for improving the stability of the emulsion. If the polyvalent isocyanate is added in an amount of more than necessary, unreacted isocyanate may slowly react with moisture and form a network in the capsule. This in turn may result in a loss of Dmax after aging.

Functionalized isocyanates may be used alone or in combination with the non-functionalized isocyanates listed above in certain embodiments of the invention. The ratio of the functionalized isocyanate to the non-functionalized isocyanate will vary depending on the nature, molecular weight and valence of the isocyanate. Usually the amount will range from about 10 to 100% functionalized isocyanate and preferably about 50 to 90%.

It is preferred to use an anionic, cationic or nonionic surface active agent and a water soluble polymer in emulsifying and dispersing the hydrophobic oily liquid because it accelerates the emulsification and prevents coagulation. Typically, the surface active agent is used in an amount of about 0 to 5% by weight, preferably 0.1 to 2% by weight, based on the hydrophobic oily liquid.

The amount of the water-soluble polymer used is usually about 0.1 to 20 wt% of the hydrophobic oily liquid to be encapsulated and is preferably about 5 to 15 wt%. The water-soluble polymer may be a water-soluble anionic polymer, a water-soluble nonionic polymer or a water-soluble amphoteric polymer. The solution of the water-soluble polymer prepared in the process generally will have a concentration of about 0.5 to 20 wt%. The hydrophobic oily liquid is dispersed in the aqueous solution in an amount of about 1 to 60 wt% of the emulsion and the concentration for the aqueous solution of urea, melamine and/or formaldehyde is 0.2 to 40 wt%, preferably 1 to 20 wt%.

Any natural or synthetic anionic polymer, e.g., polymers containing —COO—, —SO$_3$— or like groups can be used as a water soluble polymer. Examples of such natural anionic polymers are gum arabic and alginic acid. Examples of semisynthetic anionic polymers are carboxymethyl cellulose, phthalated gelatin, sulfated starch, cellulose sulfate, and lignin sulfonic acid. Synthetic anionic polymers which can be used in this invention include maleic anhydride based copolymers (including those copolymers hydrolyzed), acrylic acid based homopolymers and copolymers (including methacrylic acid based homopolymers and copolymers), vinyl-benzenesulfonic acid based homopolymers and copolymers, carboxy modified polyvinyl alcohols, polyvinyl sulfonate and copolymers, polyitaconic acid copolymers, poly (2-sulfoethyl (meth)acrylate) copolymers and their salts, poly (3-sulfopropyl (meth)acrylate) copolymers and their salts, etc.

In a preferred embodiment of the invention, the internal phase is dispersed in a solution of pectin and sulfonated polystyrene. Typical examples of sulfonated polystyrenes useful in the present invention are Versa TL500, Versa TL502B and Versa 503, products of National Starch Co. Useful sulfonated polystyrenes are generally characterized by a sulfonation degree of over 85% and preferably over 95%. The molecular weight of the sulfonated polystyrene is preferably greater than 100,000 and more preferably about 500,000 but other molecular weights can also be used. The sulfonated polystyrene is usually added to the aqueous phase in an amount of about 1 to 6% by weight. The quality of this product has also been found to vary with the method by which it is manufactured such that certain sulfonated polystyrenes are better than others.

Emulsification is preferably conducted under conditions which afford an emulsion having an average particle size in the range of about 2.5 to 10 microns. The observed particle size of the emulsion is somewhat smaller than the particle size of the capsules produced. Typically, the emulsion is prepared by adding an oily material to be encapsulated to an aqueous phase containing pectin and sulfonated polystyrene while stirring or otherwise agitating the aqueous phase to achieve the desired emulsion particle size. The aqueous phase may also include other capsule wall forming materials in a manner well known in the art.

The capsule wall can be formed around the oil droplets in the emulsion using many known wall forming techniques.

The present invention is particularly directed to forming microcapsules in which the oily core material is enwrapped in an amine-formaldehyde condensation product. Such microcapsules are formed by in situ condensation of formaldehyde and an amine such as urea, melamine, dimethylol urea, and the like, or a pre-condensate thereof. The condensation product can be modified by the co-condensation of a polyhydric phenol such as resorcinol if desired.

Microcapsules can be prepared by forming an aqueous phase containing pectin and Versa TL502B, and adjusting the pH to suit the condensation reaction to be employed, followed by the addition of the oil phase. Generally, a pH of about 4.0 is useful in making urea-formaldehyde microcapsules whereas a pH of 6.0 is used in making melamine-formaldehyde capsules. To assist in dissolving the pectin, a small amount of sodium bicarbonate may be added to the pectin. This also acts as a buffer and improves ionic strength and thereby improves wall building characteristics. Upon dissolution, carbon dioxide is generated and the bubbles help to break up the pectin.

Blending is continued until an average emulsion particle size of about 3.5 microns has been achieved whereupon solutions of the amine and formaldehyde or a solution of a precondensate thereof are/is added to the emulsion and the capsule walls gradually form.

Among many well known encapsulation techniques that can be used in the present invention are: Kiritani et al, U.S. Pat. No. 3,796,669 for urea-resorcinol-formaldehyde capsules; Forris et al, U.S. Pat. Nos. 4,001,140, 4,087,376 and 4,089,802 for melamine-formaldehyde capsules. The present invention can be practiced using the aforesaid techniques by incorporating pectin and sulfonated polystyrene prior to emulsification of the oil.

One process of this invention comprises fundamentally the following steps:

1. Preparing an aqueous solution of a water-soluble polymer. In preparing microcapsules with a urea-formaldehyde capsule wall, the urea may be added to the aqueous solution at this stage. 2. Emulsifying and dispersing the hydrophobic oily liquid to be encapsulated (to which a polyvalent isocyanate, a polyvalent isothiocyanate or a prepolymer thereof has been added) in the aqueous solution prepared in Step (1).

3. Adding an aqueous solution of melamine and formaldehyde or a precondensate thereof to the emulsion prepared in Step (2) in the case of forming melamine-formaldehyde capsule walls, and adding formaldehyde and optionally urea to the emulsion of Step (2) when forming ureaformaldehyde capsule walls.

4. Forming the capsule walls by raising the temperature of the resulting mixture while controlling the pH value and stirring, whereby the melamine and formaldehyde or urea and formaldehyde are polycondensed.

The condensation reaction proceeds under acid conditions, e.g., pH of 7 or less; however, the reaction is preferably carried out at a pH in the range of 2.5 to 5.0. The temperature of the encapsulation medium should be maintained at about 10° to 95° C., preferably about 25° to 85° C. and more preferably about 45° to 75° C.

Among the acid catalysts that may be used are low molecular weight carboxylic acids, e.g., sulfuric acid, hydrochloric acid, phosphoric acid, etc.; and acidic or easily hydrolyzable salts such as aluminum sulfate, ammonium nitrate, ammonium chloride, ammonium sulfate, etc. Ammonium salts are preferred as they seem to provide a stronger and less permeable capsule. The ammonium salts are usually employed in an amount of about 2 to 20% by weight based on the amount of urea.

The amine and formaldehyde are preferably present in the encapsulation medium, whether as the free monomer or a precondensate, in a molar ratio of formaldehyde to amine of at least 1.5 and preferably about 2.0 to 3.0.

To reduce malodor and the incidence of skin irritation, when the polymerization reaction is complete, it is desirable to remove or react the excess formaldehyde. This can be accomplished by using any one of several known techniques such as the addition of phosphoric acid, urea, sulfite or bisulfite. These materials react with the formaldehyde to form a product which is easily removed from the medium. The addition of the urea or sodium sulfite to scavenge formaldehyde is preferably made in a single step after encapsulation and prior to storage. The pH and temperature of the medium should be adjusted for this reaction. The sulfite is preferably reacted at a pH of 6 to 8 at room temperature for about 2 hours. The urea can be reacted at a pH of 3 to 5 or 8 to 12 at a temperature of 30 to 60° C. for 4 hours.

Suitable polyhydric phenols that may be added to the reaction system for co-condensation with the amine and formaldehyde to improve impermeability are resorcinol, catechol, gallic acid, and the like. The phenols may be added in an amount of 5 to 30% by weight based on the amount of urea.

The process of the present invention is advantageously used to produce microcapsules which may be provided on a paper or film support for use in photographic or pressure-sensitive recording papers. In the former embodiment, the core material is typically a substantially colorless color former dissolved in an oil. In the latter embodiment, the core material is typically a photohardenable composition containing a color former. U.S. Pat. Nos. 4,399,209 and 4,772,541 disclose photosensitive record sheets which may be prepared using the present invention.

The invention is illustrated in more detail by the following non-limiting example with respect to the preparation of photohardenable microcapsules:

EXAMPLE 1

1. The following internal phase composition was prepared and pre-heated to 90° C. to enhance the dissolution of dye precursor:

| | |
|---|---|
| TMPTA (trimethylolpropane triacrylate) | 120 g |
| DPHPA (dipentaerythritolpentacrylate) | 30 g |
| Photoinitiator | 0.65 g |
| Diisopropyldimethyl aniline | 0.5 g |
| Magenta dye precursor | 36 g |
| Demodur DA | 10 g |

2. The continuous phase was prepared in ambient condition as follows:

8 g Versa TL502B was dissolved in 430 g water by stirring at 500 rpm for 15 minutes or more and 12.65 g pectin was dry blended with 0.24 g sodium bicarbonate and dissolved into the water phase by stirring at 1500 rpm. The pH was adjusted by dropwise addition of NaOH (4.8% solution) to pH 6.0.

3. Emulsification:

The external continuous phase containing Versa TL502B and pectin was brought to 3000 rpm mixing and the internal phase material (oil) was added into the mixing continuous phase. Mixing was maintained at 3000 rpm for 15 minutes after oil phase addition.

4. Wall formation:

246 g melamine-Formaldehyde prepolymer aqueous solution was added to the emulsion while mixing at 1500 rpm and the pH was adjusted to pH 6.0 with $H_3PO_4$ (5% solution). The reaction mixture was covered and held at 70° C. for 1 hour while mixing at 1500 rpm. A solution of 46.2 g Urea @ 50% solution was added to the reaction mixture and reaction was allowed to continue at 70° C. for 40 minutes. (This step scavenges unreacted formaldehyde). The stirring was adjusted to 500 rpm. The pH was adjusted to about 9.5 with NaOH (4.8% solution), the reaction vessel was covered and allowed to cool in ambient condition while mixing at 500 rpm.

Microcapsules produced using the process just described had the size distribution shown in FIG. 1 as measured on a particle size analyzer (Coulter Multisizer).

COMPARISON EXAMPLE 1

Figure 2:
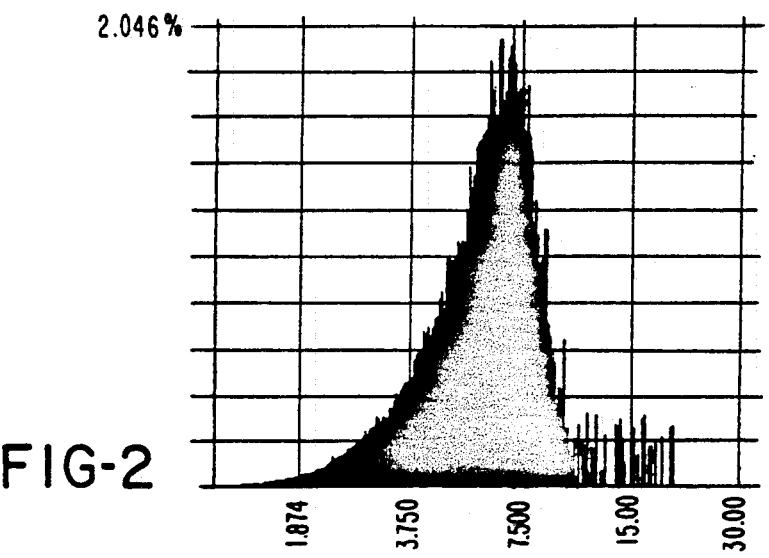
FIGS. 2 and 6 are particle size analyses for microcapsules prepared as outlined in Comparison Examples 1 and 2.

In a comparison example, Desmodur N-100, a non-functionalized biuret of HDI, was used in place of Desmodur DA. Otherwise the procedure was the same as Example 1. The microcapsules had the size distribution shown in FIG. 2.

EXAMPLES 2-4

Example 1 was repeated except the emulsification speed was 2000 rpm and the amount of Desmodur DA was as follows:

| | |
|---|---|
| Example 2 | 5 g |
| Example 3 | 10 g |
| Example 4 | 15 g |

Figure 3:
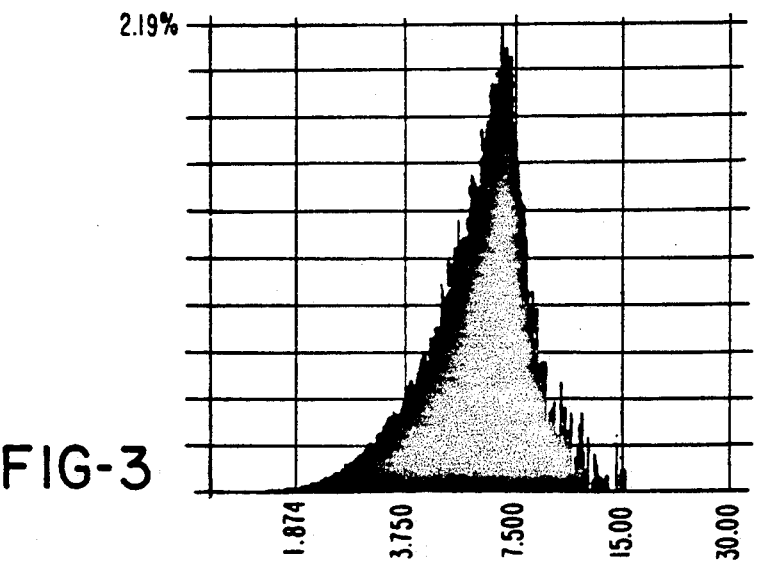
Figure 4:
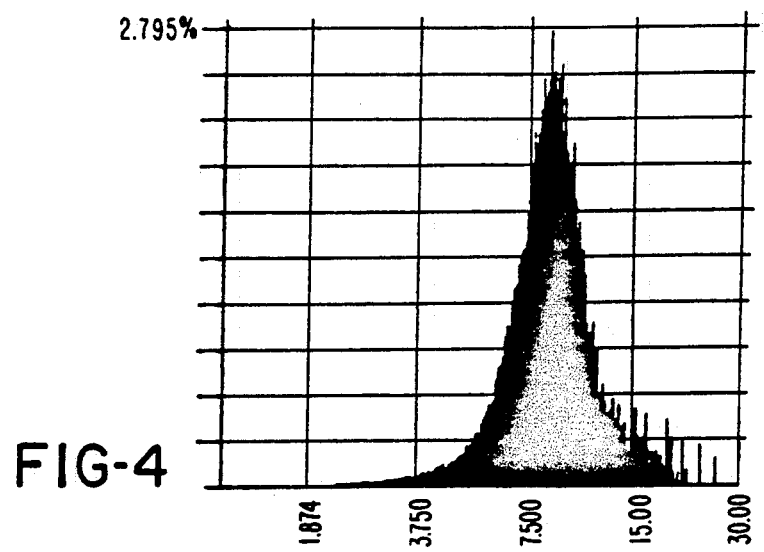
Figure 5:
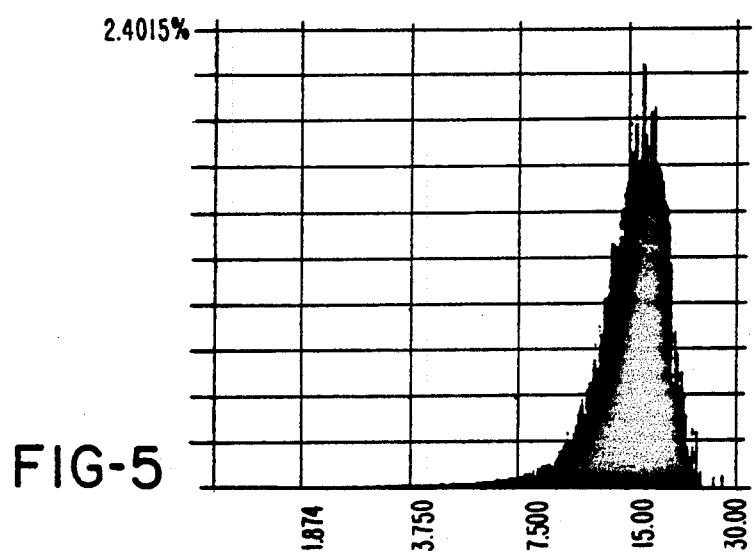

The particle size distribution is shown in FIGS. 3-5.

COMPARISON EXAMPLE 2

Figure 6:
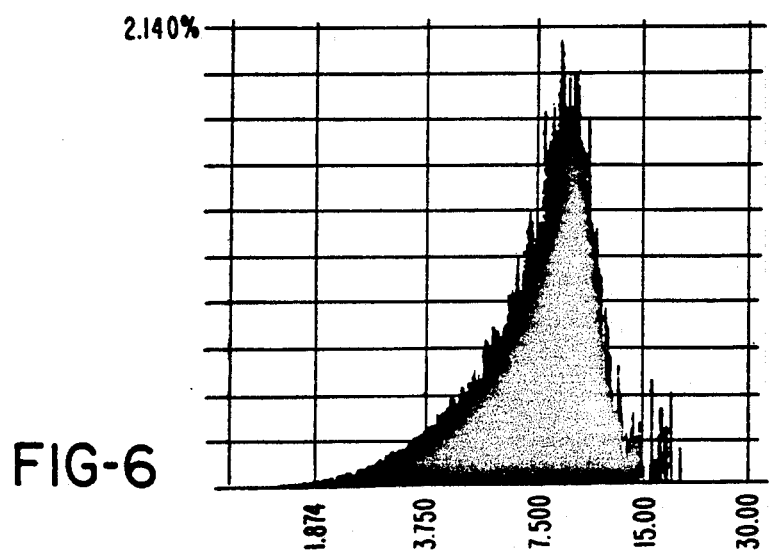

Comparison Example 1 was repeated except the emulsification speed was 2000 rpm. The particle size distribution is shown in FIG. 6.

Having described the invention in detail and by reference to a specific embodiment thereof, it will be apparent that numerous variations and modifications are possible without departing from the spirit and scope of the invention as defined by the following claims.

What is claimed is:

1. A method for preparing microcapsules which comprises:

preparing an aqueous dispersion or emulsion of a hydrophobic oily core material containing a polyvalent isocyanate, a polyvalent isothiocyanate, or an adduct containing at least one of said polyvalent isocyanate and said polyvalent isothiocyanate, said polyvalent isocyanate and said polyvalent isothiocyanate having an anionic moiety; and forming capsule walls around the droplets of said oily core material.

2. The method of claim 1 wherein said anionic moiety is a moiety containing a group selected from the class consisting of $OSO_3-$, $OPO_3^{-2}$, $COO-$, $SO_2O-$, $S_2O_3-$, $POO-$ and $PO_3^{-2}$.

3. The method of claim 2 wherein said oily core material contains a sulfonated polyvalent isocyanate, a sulfonated polyvalent isothiocyanate, or a sulfonated adduct of a polyvalent isocyanate or isothiocyanate.

4. The method of claim 2 wherein said oily core material contains an adduct of a polyvalent isocyanate or a polyvalent isothiocyanate and a sulfonated polyhydric compound.

5. The method of claim 4 wherein said sulfonated polyhydric compound is a sulfonated dicarboxylic acid, a sulfonated diol or a sulfonated diamine.

6. The method of claim 5 wherein said sulfonated polyhydric compound is 4-sulfophthalic acid.

7. Microcapsules prepared by the process of claim 1.

8. A method for forming microcapsules which comprises:

forming an emulsion or aqueous dispersion of an oily core material containing a polyvalent isocyanate, a polyvalent isothiocyanate, or an adduct containing at least one of said polyvalent isocyanate and said polyvalent isothiocyanate, said polyvalent isocyanate nad said polyvalent isothiocyanate having an anionic moiety, and enwrapping particles of said oily core material in an amine-formaldehyde condensation product.

9. The method of claim 8 wherein said anionic moiety is a moiety containing a group selected from the class consisting of $OSO_3-$, $OPO_3^{-2}$, $COO-$, $SO_2O-$, $S_2O_3-$, $POO-$ and $PO_3^{-2}$.

10. The method of claim 9 wherein said amine-formaldehyde condensation product is a melamine-formaldehyde condensation product.

11. The method of claim 10 wherein said oily core material contains a sulfonated polyvalent isocyanate, a sulfonated polyvalent isothiocyanate, or a sulfonated adduct of a polyvalent isocyanate or isothiocyanate.

12. The method of claim 10 wherein said oily core material contains an adduct of a polyvalent isocyanate or a polyvalent isothiocyanate and a sulfonated polyhydric compound.

13. The method of claim 12 wherein said sulfonated polyhydric compound is sulfonated dicarboxylic acid, a sulfonated diol or a sulfonated diamine.

14. The method of claim 13 wherein said sulfonated polyhydric compound is 4-sulfophthalic acid.

15. The method of claim 10 wherein said continuous aqueous phase contains a water soluble anionic polymer.

16. The method of claim 14 wherein said anionic polymer is a homopolymer or a copolymer of vinyl benzene sulfonic acid.

17. The method of claim 16 wherein said oily core material contains an adduct of a biuret of HDI and 4-sulfophthalic acid.

18. A pressure-sensitive or photosensitive recording sheet comprising a support having a layer of microcapsules on the surface thereof, said microcapsules being prepared by the process of claim 1.

* * * * *